(12) United States Patent
Murphy et al.

(10) Patent No.: US 8,726,182 B1
(45) Date of Patent: May 13, 2014

(54) MULTI-STAGE THROBBER

(75) Inventors: Glen Murphy, Palo Alto, CA (US);
Brian Rakowski, Palo Alto, CA (US);
Ben Goodger, Los Altos Hills, CA (US);
Darin Fisher, San Carlos, CA (US)

(73) Assignee: Google Inc., Mountain View, CA (US)

( * ) Notice: Subject to any disclaimer, the term of this patent is extended or adjusted under 35 U.S.C. 154(b) by 1024 days.

(21) Appl. No.: 12/552,100

(22) Filed: Sep. 1, 2009

Related U.S. Application Data

(60) Provisional application No. 61/093,443, filed on Sep. 1, 2008.

(51) Int. Cl.
*G06F 3/048* (2006.01)

(52) U.S. Cl.
USPC .......................................... 715/772; 715/859

(58) Field of Classification Search
USPC ................................. 715/772, 859
See application file for complete search history.

(56) References Cited

U.S. PATENT DOCUMENTS

| | | | | |
|---|---|---|---|---|
| 7,003,726 | B2 * | 2/2006 | Walker et al. ................. | 715/717 |
| 8,370,754 | B2 * | 2/2013 | Bull et al. ..................... | 715/748 |
| 2002/0143627 | A1 * | 10/2002 | Barsade et al. ................. | 705/14 |
| 2003/0018714 | A1 * | 1/2003 | Mikhailov et al. ............ | 709/203 |
| 2005/0091614 | A1 * | 4/2005 | Wasko et al. ................. | 715/861 |
| 2008/0168376 | A1 * | 7/2008 | Tien et al. ..................... | 715/772 |
| 2009/0064143 | A1 * | 3/2009 | Bhogal et al. ................. | 718/100 |
| 2009/0113334 | A1 * | 4/2009 | Chakra et al. ................. | 715/772 |
| 2009/0228823 | A1 * | 9/2009 | Edwards et al. .............. | 715/772 |

OTHER PUBLICATIONS

MozillaZine, "Customizing throbber", Jul. 8, 2007, http://kb.mozillazine.org/Customizing_throbber, p. 1.*
Brasington, Leigh, "Leigh Brasington's Netscape 4.0 Throbber Tips and Tricks", leighb.com, Nov. 4, 2005, accessed at http://www.leighb.com/throbn4x.htm, accessed on Feb. 24, 2010, 2pgs.
Brasington, Leigh, "Leigh Brasington's Throbber Page For Netscape 3.x and 4.0", leighb.com, Nov. 4, 2005, accessed at http://www.leighb.com/throbn3.htm, accessed on Feb. 24, 2010, 2pgs.
Brasington, Leigh, "Leigh Brasington's Throbber Page For Internet Explorer 5.5 and 6.0", leighb.com, Nov. 4, 2005, accessed at http://www.leighb.com/throbmie.htm, accessed on Feb. 24, 2010, 3pgs.

* cited by examiner

*Primary Examiner* — Andrea Leggett
(74) *Attorney, Agent, or Firm* — Sterne, Kessler, Goldstein & Fox P.L.L.C.

(57) ABSTRACT

A multi-stage throbber that can be used to communicate stages of progress of resource loading in a browser to a user. In an embodiment, a method for communicating resource loading progress in a browser is provided. The method includes evaluating the resource loading progress, identifying a throbber stage representative of the evaluated resource loading progress, and outputting multi-stage throbber data for rendering a multi-stage throbber at the identified throbber stage.

20 Claims, 4 Drawing Sheets

300a

300b

300c

MULTI-STAGE THROBBER

CROSS REFERENCE TO RELATED APPLICATIONS

This patent application claims the benefit of U.S. Provisional Patent Application No. 61/093,443 filed on Sep. 1, 2008, entitled "MULTI-STAGE THROBBER," which is incorporated by reference herein in its entirety.

BACKGROUND OF THE INVENTION

1. Field of the Invention

The present invention relates to browser technology.

2. Background Art

Computer software frequently provides a throbber (e.g., spinning hourglass, beachball, etc.) while a resource loading is in progress. This masks the fact that the software does not know how long the task will take to complete. Modern web browsers use such a throbber while a resource (e.g., page) loading is in progress. However, because the activities of the browser are masked behind the throbber, the browser may feel slow as a result. For example, a SAFARI browser available from Apple, Inc. has a not-enabled-by-default throbber, a circular progress meter, in the location bar that circles uniformly as the connection proceeds. An ITUNES application available from Apple, Inc. also has a meter that uniformly circles as a connection proceeds. These uniform throbbers are unable to visually communicate the 'waiting for server to respond' state of a transfer, and do not animate during that period of time.

BRIEF SUMMARY OF THE INVENTION

Embodiments of the present invention relate to multi-stage throbbers that can be used to communicate stages of progress of resource loading in browsers to users. In an embodiment, a method for communicating resource loading progress in a browser is provided. The method includes evaluating the resource loading progress, identifying a throbber stage representative of the evaluated resource loading progress, and outputting multi-stage throbber data for rendering a multi-stage throbber at the identified throbber stage.

In another embodiment, a device that communicates stages of resource loading progress in a browser using a multi-stage throbber comprises a progress evaluator and a throbber stage identifier. The progress evaluator evaluates the resource loading progress based on the state. The throbber stage identifier identifies a throbber stage representative of the evaluated resource loading progress.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left most digit in the corresponding reference number.

Figure 3A:
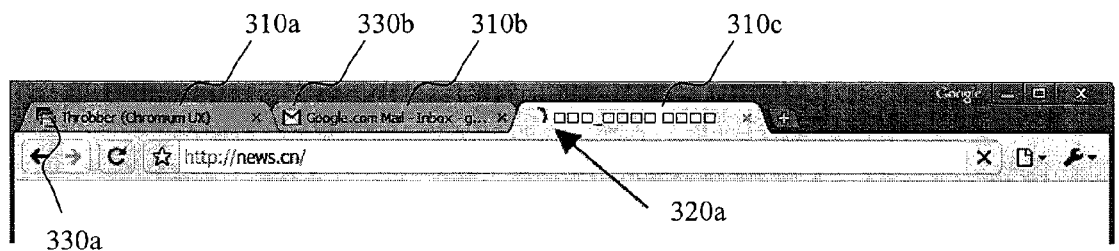
Figure 3B:
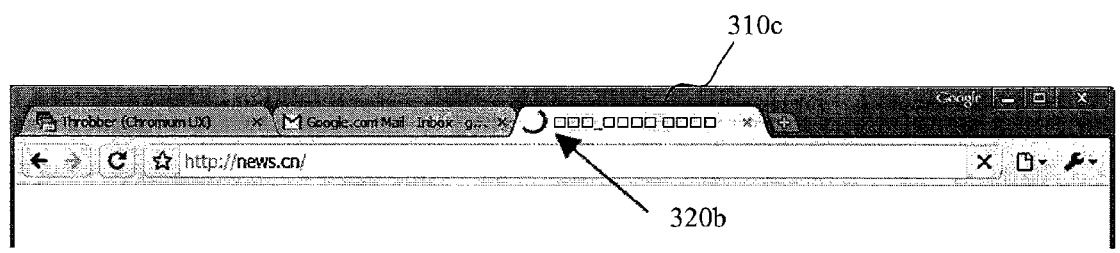
Figure 3C:
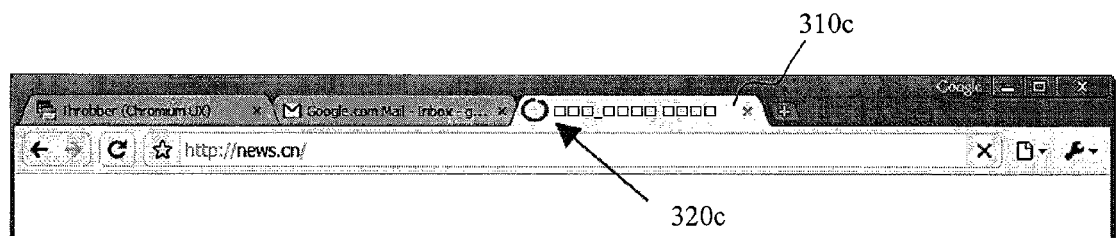

FIGS. 3A-C are examples of a multi-stage throbber indicating different stages of resource loading progress on a browser according to one embodiment of the invention.

Figure 4:
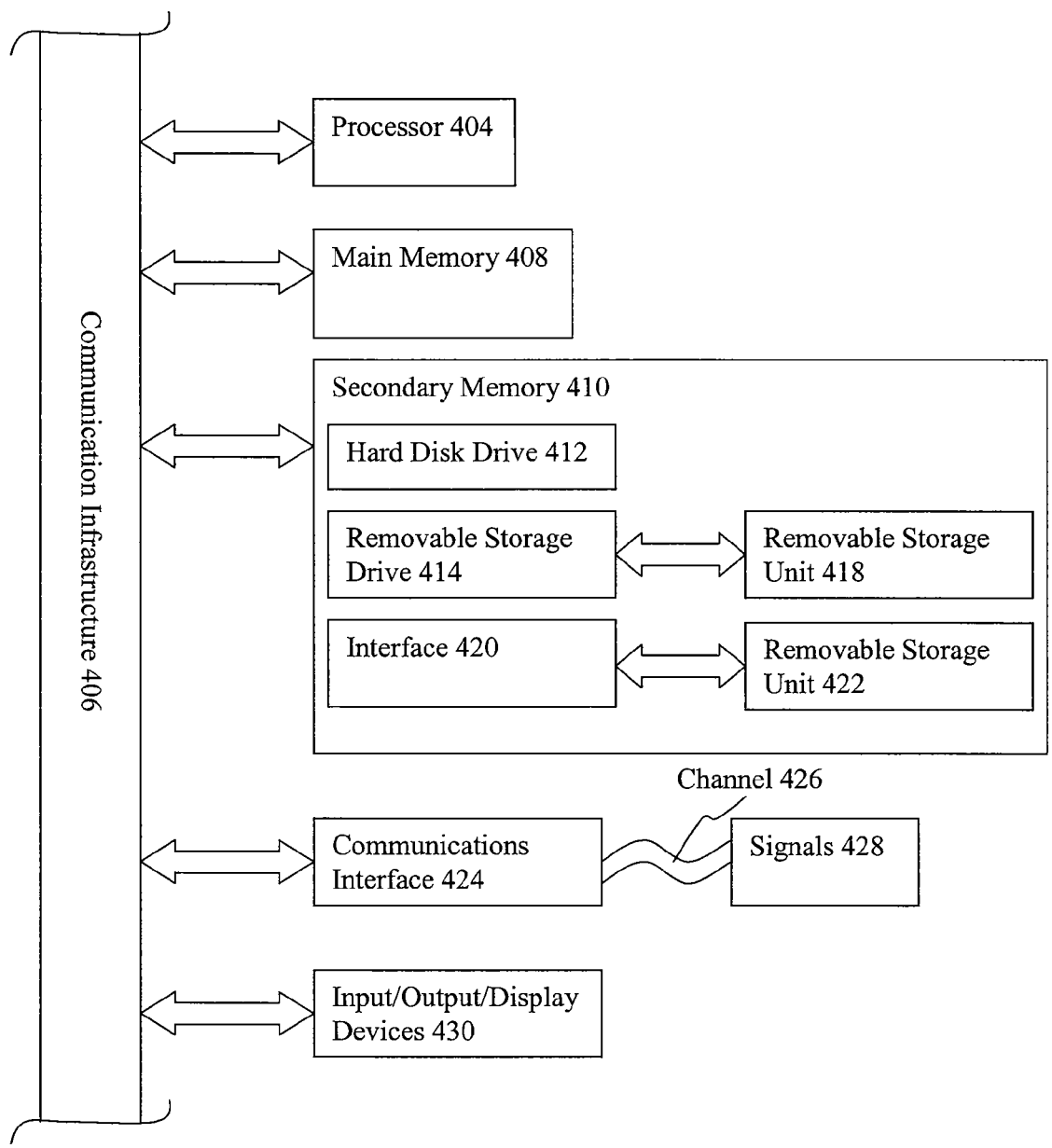

FIG. 4 is a diagram of an exemplary computer system for executing a browser with a multi-stage throbber according to one embodiment of the invention.

DETAILED DESCRIPTION OF THE INVENTION

The present invention relates to systems and methods for visually communicating resource loading progress on a browser using a multi-stage throbber. In one aspect, multi-stage throbbers having multiple display stages are used to visually communicate stages of resource loading progress with users. In one feature, a multi-stage throbber that indicates stages of progress during resource loading of a browser is displayed on a specified location of the browser. The location may be, for example, an area within a tab associated with the resource loading.

A "multi-stage" throbber is a throbber having different graphical elements with properties associated with respective stages of a process being represented by the throbber. For example, a multi-stage throbber may be a set of graphical elements with properties, such as, size, length, color, opacity, or other visual property, indicative of the respective stages of a process being represented. In a further embodiment, a multi-stage throbber may also be in an animated form to further show resource loading is in progress.

In the detailed description of embodiments of the invention herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

System Overview

Figure 1:
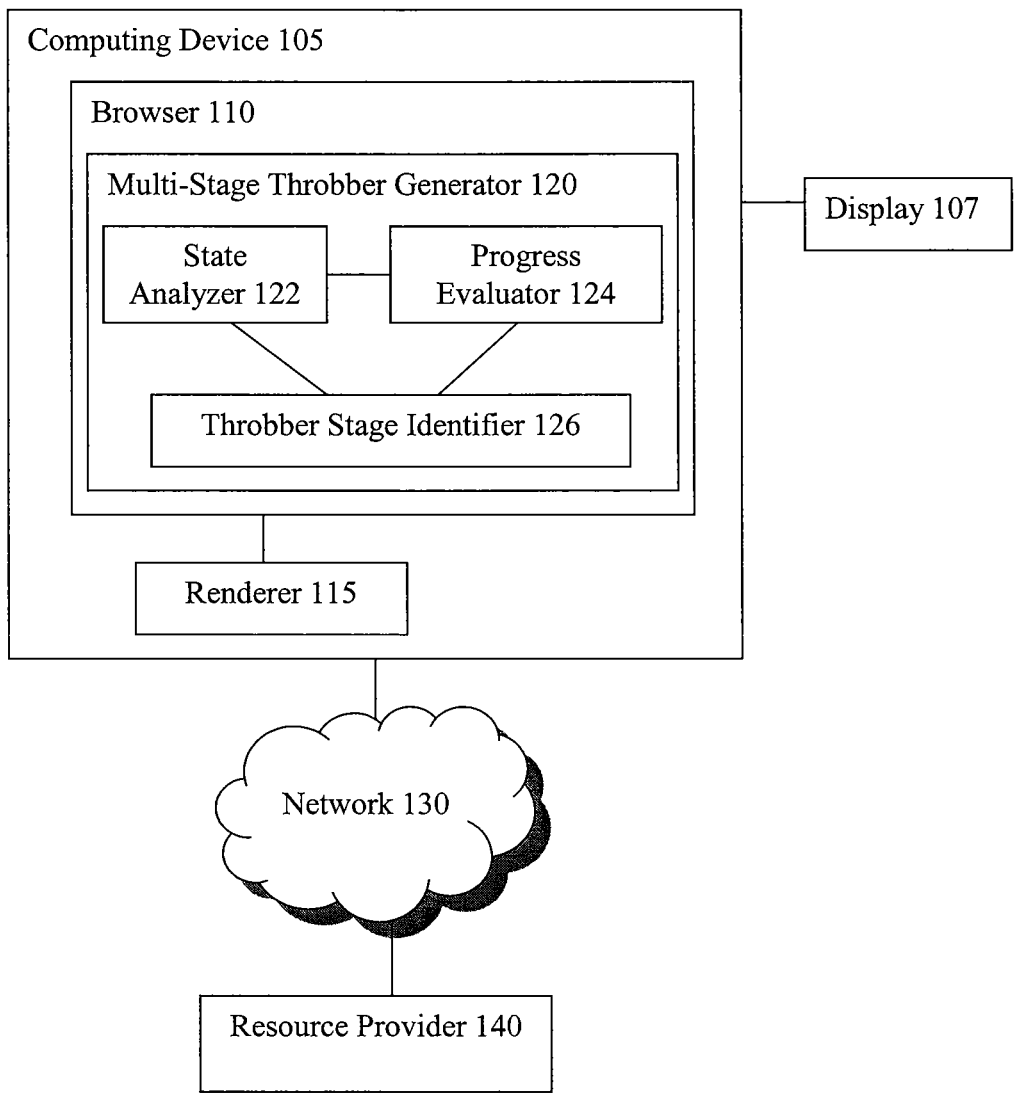
FIG. 1 is a diagram of an exemplary system that visually communicates resource loading progress on a browser using a multi-stage throbber according to one embodiment of the invention.

FIG. 1 is a diagram of exemplary system 100 that uses a multi-stage throbber to visually communicate stages of resource loading progress to a user viewing a browser. System 100 includes a computing device 105, display 107, and resource provider 140. Computing device 105 may be coupled to display 107, and may be coupled via one or more networks 130 to a resource provider 140.

Computing device 105 may be any type of computing device including, but not limited to, a computer, workstation, distributed computing system, embedded system, stand-alone electronic device, networked device, mobile device (e.g. mobile phone or mobile computing device), rack server, television, game console, set-top box, kiosk, or other device having at least one processor and memory.

Computing device 105 includes a browser 110 and a renderer 115. Browser 110 processes resource load requests and displays the loaded results for the user. In one embodiment, for example, browser 110 may be a web browser that can be used by a user to access resources from web servers. In alternative embodiments, browser 110 may be other types of browsers for browsing remote or local content.

According to an embodiment, browser 110 may include any device, application or module that enables a user or computer to navigate and/or retrieve data from another data source, typically over a network. Browser 110 may include any conventional browser including but not limited to, for example, FIREFOX available from Mozilla Foundation Inc., INTERNET EXPLORER available from Microsoft Corp., SAFARI available from Apple, Inc., and OPERA available from Opera Software ASA. Browser 110 may also be a multi-process browser as described in "Multi-Process Browser Architecture," by Fisher et al., U.S. Provisional Appl. No. 61/052,719, filed May 13, 2008. According to a further embodiment, browser 110 may also be configured to use any number of protocols, including Web protocols such as HTTP.

Browser 110 can send a request over network 130 to resource provider 140 and receive a response from resource provider 140 via computing device 105. As an example, not to limit the present invention, the request may be a hypertext transfer protocol (HTTP) request. The HTTP request may contain parameters entered by a user using a user interface at computing device 105. The response may be an HTTP response. An HTTP response may contain web content, such as a hypertext markup language (HTML), images, video, or multimedia content. Browser 110 may exist within or be executed by hardware in computing device 105. For example, browser 110 may be software, firmware, or hardware or any combination thereof in computing device 105.

Multi-Stage Throbber Generator

According to an embodiment, browser 110 includes a multi-stage throbber generator 120. Multi-stage throbber generator 120 generates data for output to renderer 115 to enable rendering of a multi-stage throbber. Multi-stage throbber generator 120 includes a stage analyzer 122, a progress evaluator 124, and a throbber stage identifier 126.

State analyzer 122 analyzes a resource loading process and decides the state of the resource loading. The state, for example, may be "waiting for response from resource provider", or "transferring resource from resource provider", etc. The examples are illustrative and are not intended to limit the present invention.

Progress evaluator 124 evaluates the progress of the resource loading. In one example, this progress evaluator may include estimating the remaining time to complete the resource loading given the analyzed state. For example, in one embodiment, progress evaluator 124 may estimate how much longer the browser has to wait for a response from resource provider 140 or the remaining transferring time to load the resource from resource provider 140.

Throbber stage identifier 126 identifies a stage of the multi-stage throbber representing the evaluated progress of the resource loading process. In one embodiment, throbber stage identifier 126 may also identify a graphical element corresponding to the identified throbber stage of the multi-stage throbber. Multi-stage throbber generator 120 then output data to renderer 115 to enable rendering of a multi-stage throbber at the identified throbber stage.

Renderer 115 receives the data output from multi-stage throbber generator 120 and renders the data to obtain display data for a multi-stage throbber that can visually communicate the stage of progress of the resource loading in the analyzed state on the browser to a user. Renderer 115 may be any type of renderer. In one example, renderer 115 can render the data output from multi-stage throbber generator 120 to obtain data that can be stored in a frame buffer (not shown) for display on display 107.

Browser 110, multi-stage throbber generator 120, state analyzer 122, progress evaluator 124, throbber stage identifier 126, and renderer 115 may each be implemented as software, hardware, firmware, or any combination thereof.

Network 130 can be any network or combination of networks that can carry data communication. In addition, network 130 also contains sites that can be accessed for information retrieval. Such networks can include, but are not limited to, local area networks, medium area networks, and/or wide area networks such as the Internet. They can support protocols and technology including, but not limited to, World Wide Web protocols and/or services. Intermediate web servers, gateways, or other servers may be provided between components of system 100 depending upon a particular application or environment.

Resource provider 140 provides resources to be loaded in browser 110. In one embodiment, resource provider 140 may include a web server. A web server is a software component that responds to an HTTP request with an HTTP response. As illustrative examples, the web server may be, without limitation, an Apache HTTP Server, Apache Tomcat, MICROSOFT Internet Information Server, JBOSS Application Server, WEBLOGIC Application Server, or SUN JAVA System Web Server. The web server may contain web applications which generate content in response to an HTTP request. The web server may package the generated content and serve the content to a client in the form of an HTTP response. Such content may include HTML, extensible markup language (XML), documents, videos, images, multimedia features, or any combination thereof. This example is strictly illustrative and does not limit the present invention.

Method for Visually Communicating Resource Loading Progress Stages

Figure 2:
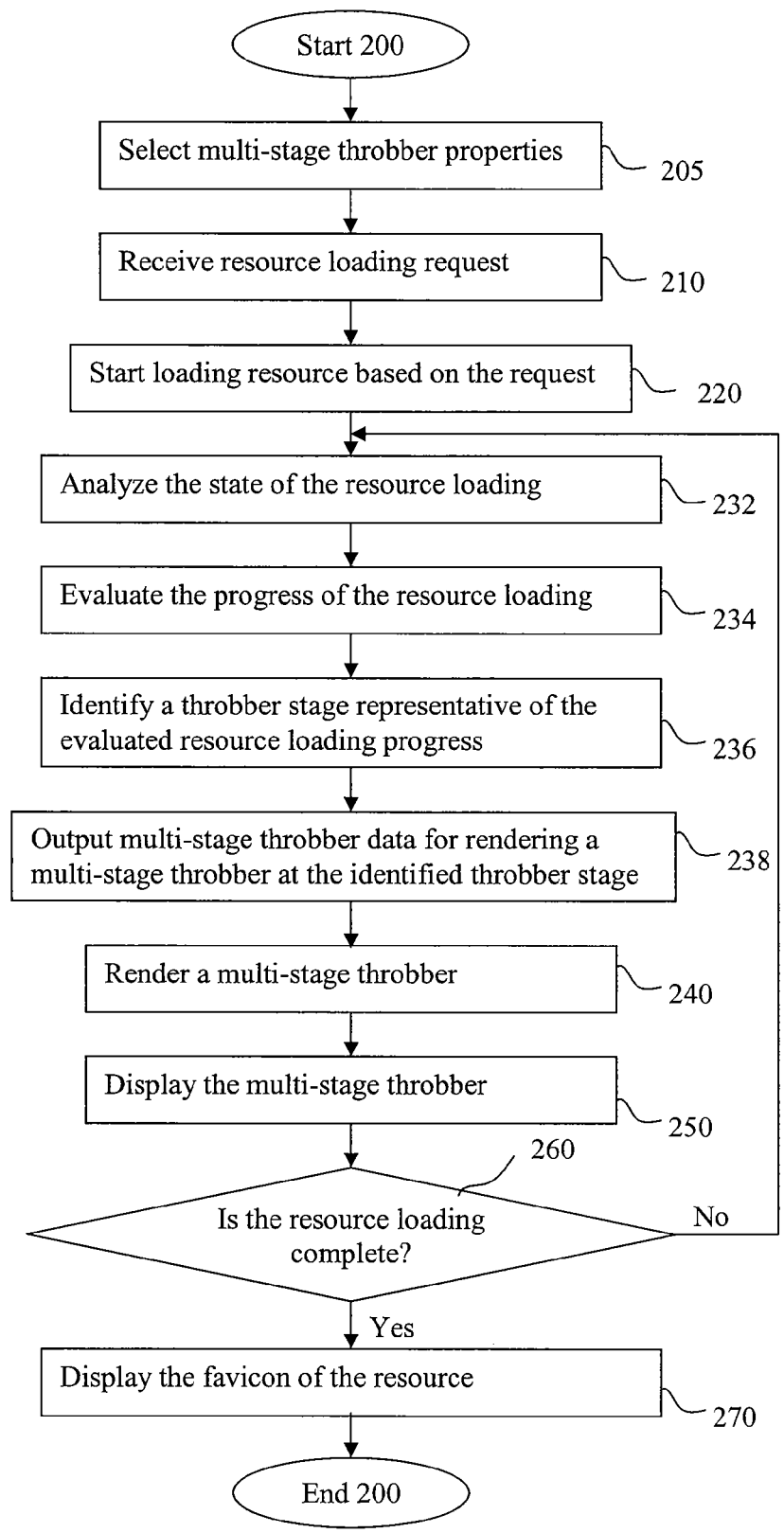
FIG. 2 is a flowchart of an exemplary procedure for visually communicating resource loading progress on a browser using a multi-stage throbber according to one embodiment of the invention.

FIG. 2 illustrates a flowchart of an exemplary procedure 200 for visually communicating stages of progress during resource loading to a user using a multi-stage throbber according to one embodiment (steps 205-270). Although procedure 200 will be described for brevity with reference to system 100 shown in FIG. 1, procedure 200 can be used in other systems for visually communicating resource loading progress on browsers with users.

In step 205, one or more properties of a multi-stage throbber are selected. The properties of the multi-stage throbber may be pre-determined or selected by a browser user. The browser may be browser 110 of system 100. In one embodiment, the properties may include a type of a multi-stage throbber graphical element. For example, types of multi-stage throbber graphical elements may include but are not limited to, an hourglass, a spinning wheel, a circular arrow, icon, image, text, or figure. These examples are strictly illustrative and are not intended to limit the present invention.

The properties of the multi-stage throbber may also include a display mode. The display mode identifies how to display or animate the multi-stage throbber. For example, in one embodiment, the display mode property may be one for rotating the multi-stage throbber. In such a display mode, a rotating angle of the multi-stage throbber corresponds to the progress of the resource loading. In another exemplary embodiment, a display mode may be a coloring of the multi-stage throbber. In this display mode, the saturation level of the color may correspond to the progress of the resource loading. Alternatively, different colors may correspond to different levels of the resource loading progress. In yet another exemplary embodiment, the display mode may be resizing the multi-stage throbber. In such display mode, the size of the multi-stage throbber corresponds to the resource loading progress. Animation can also be used. These examples are strictly illustrative and are not intended to limit the present invention.

In step 210, browser 110 receives or initiates a request to load resource from a resource provider. The resource provider may be resource provider 140. The resource, for example, may be HTML, extensible markup language (XML), documents, videos, images, multimedia features, or any combination thereof. These examples are strictly illustrative and does not limit the present invention.

In step 220, browser 110 starts to load the requested resource from resource provider 140. During the resource loading process, a multi-stage throbber generator of browser 110 checks the state and progress of the resource loading process. The multi-stage throbber generator may be multi-stage throbber generator 120.

The resource loading process may have multiple stages or states. For example, in one embodiment, the states of resource loading may include, but not limited to, "waiting for response from resource provider", "transferring resource from resource provider", "connecting to resource provider", etc. Thus, in step 232, state analyzer 122 analyzes the state of the resource loading. Once information of the state of the resource loading is obtained, in step 234, progress evaluator 124 evaluates the resource loading progress given the analyzed state. In one embodiment, progress evaluator 124 estimates how much time remaining to complete the part of the process in the state. For example, in one embodiment, if the resource loading process is waiting for response from resource provider 140, progress evaluator 124 estimates the remaining time to receive the response from resource provider 140. If the resource loading process is transferring resource from resource provider 140, progress evaluator 124 estimates the remaining time to complete the transfer. These examples are strictly illustrative and are not intended to limit the present invention.

Once the state and the progress of the resource loading are evaluated, in step 236, throbber stage identifier 126 identifies a throbber stage representing the state and the progress of the resource loading.

In step 238, multi-stage throbber generator 120 outputs multi-stage throbber data for rendering the multi-stage throbber at the throbber stage (identified in step 236) and according to the one or more properties selected in step 205.

For example, in one embodiment, if the display mode is rotating the multi-stage throbber, the multi-stage throbber data output may identify a rotating direction and a rotating angle. The rotating direction corresponds to the state of the resource loading, e.g. counterclockwise for "waiting for response from resource provider" and clockwise for "transferring from resource provider". The rotating angle is corresponding to the progress of the resource loading in the state. For example, the rotating angle may be calculated such that it is proportional to the estimated completion time of the resource loading in the state.

In another embodiment, if the display mode is coloring the multi-stage throbber, the multi-stage throbber output data may identify a color and a saturation level of the color. The color is corresponding to the state of the resource loading, for example, "red" for "waiting for response from resource provider" and "blue" for "transferring from resource provider". The saturation level of the color is corresponding to the progress of the resource loading in the state. For example, the more saturated color indicates the closer to the completion of the resource loading in the state. Other types of coloring schemes to visualize the resource loading progress can also be used in alternative embodiments.

In yet another exemplary embodiment, if the display mode is resizing the multi-stage throbber, the multi-stage throbber data may identify a color and a size of the multi-stage throbber. The color is corresponding to the state of the resource loading, for example, "red" for "waiting for response from resource provider" and "blue" for "transferring from resource provider". The size of the multi-stage throbber is corresponding to the progress of the resource loading in the state. For example, the multi-stage throbber may be small and red when the resource loading starts and become bigger and blue when the resource loading approaches completion.

These examples are strictly illustrative and are not intended to limit the present invention. Other types of graphical elements and display modes (or combinations thereof) may also be used for rendering the multi-stage throbber.

In step 240, renderer 115 renders the output multi-stage throbber data to obtain display data for the corresponding multi-stage throbber.

In step 250, the obtained display data for the rendered multi-stage throbber is displayed on a pre-determined or user-specified location on the browser. For example, the rendered multi-stage throbber may be displayed on the top left corner of the tab displaying the content corresponding to the loaded resource. Users can also specify a location where the multi-stage throbber is displayed.

In step 260, multi-stage throbber generator 120 checks whether the resource loading process is complete. If the resource loading is not complete, multi-stage throbber generator 120 goes back to step 230, to analyze and evaluate the resource loading state and progress again. Otherwise, multi-stage throbber generator 120 proceeds to step 270, displays the favicon (e.g. the logo of the resource) on the browser and terminates procedure 200.

Further Examples

FIGS. 3A-3C illustrate examples of using a multi-stage throbber displayed at different stages to indicate the resource loading progress according to one embodiment of the invention. FIG. 3A shows a top portion of a tabbed browser display 300a. Tabs 310a-c are tabs corresponding to different locations (i.e., URLs, file names or other identifiers). Multi-stage throbber 320a is an icon indicating the resource loading progress in tab 310c. In particular, multi-stage throbber 320a is a circular graphical element with its arc length being a function of (such as proportional to) the estimated completion time of the resource loading progress. Icons 330a and 330b are favicons for the resource displayed in tabs 310a and 310b respectively. In FIG. 3B, as the resource loading process in tab 310c continues to a different state, multi-stage throbber 320b has a longer arc length compared to multi-stage throbber 320a of FIG. 3A. As the resource loading process in tab 310c continues to a still different state of being nearly completed, multi-stage throbber 320c in FIG. 3C appears as almost a full circle.

In one exemplary embodiment, the multi-stage throbber is displayed on the tab of the browser. Such feature may allow the browser to communicate the resource loading progress with a user even when the resource is loading in a background tab. Thus, the user does not need to bring the tab to foreground to check the progress. This is extremely useful when there are multiple resource loading processes at different tabs on the browser at the same time.

By using a multi-stage throbber, the browser can visually communicate with the user about stages of a resource loading progress for better user experience.

Example Computer Systems

Embodiments of the present invention may be implemented using hardware, firmware, software or a combination thereof and may be implemented in a computer system or other processing system. In an embodiment, a computer program product may execute on a computing device capable of carrying out the functionality described herein. An example of a computing device, computer system 400, is shown in FIG. 4. The computer system 400 includes one or more processors, such as processor 404. The processor 404 is connected to a communication infrastructure 406 (such as a bus). Various software embodiments are described in terms of this example computer system. After reading this description, it will become apparent to a person skilled in the relevant art how to implement embodiments of the invention using other computer systems and/or computer architectures.

Computer system 400 also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418, represents a floppy disk, magnetic tape, optical disk, memory card, etc. which is read by and written to by removable storage drive 414. As will be appreciated, the removable storage unit 418 includes a computer usable storage medium having stored therein computer software and/or data.

In alternative embodiments, secondary memory 410 may include other similar means for allowing computer programs or other instructions to be loaded into computer system 400. Such means may include, for example, a removable storage unit 422 and an interface 420. Examples of such may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communication interface 424. Communication interface 424 enables computer 400 to communicate with external and/or remote devices. For example, communication interface 424 allows software and data to be transferred between computer system 400 and external devices. Communication interface 424 also allows computer 400 to communicate over communication networks, such as LANs, WANs, the Internet, etc. Communication interface 424 may interface with remote sites or networks via wired or wireless connections. Examples of communications interface 424 may include a modem, a network interface (such as an Ethernet card), a communications port, a PCMCIA slot and card, etc. Computer 400 receives data and/or computer program products via communication network 424. Software and data transferred via communications interface 424 are in the form of signals 428 which may be electronic, electromagnetic, optical or other signals capable of being received by communications interface 424. These signals 428 are provided to communications interface 424 via a communications path (i.e., channel) 426. This channel 426 carries signals 428 and may be implemented using wire or cable, fiber optics, a phone line, a cellular phone link, an RF link or other communications channels.

In this document, the terms "computer program medium" and "computer usable medium" are used to generally refer to media such as removable storage drive 414, a hard disk installed in hard disk drive 412, and signals 428. These computer program products are means for providing software to computer system 400.

Computer programs (also called computer control logic) are stored in main memory 408 and/or secondary memory 410. Computer programs may also be received via communications interface 424. Such computer programs, when executed, enable the computer system 400 to perform the features of the present invention as discussed herein. In particular, the computer programs, when executed, enable the processor 404 to perform the features of embodiments of the present invention. Accordingly, such computer programs represent controllers of the computer system 400.

In an embodiment where the invention is implemented using software, the software may be stored in a computer program product and loaded into computer system 400 using removable storage drive 414, hard disk drive 412 or communications interface 424. The control logic (software), when executed by the processor 404, causes the processor 404 to perform the functions of embodiments of the invention as described herein.

Computer 400 also includes input/output/display devices 432, such as monitors, keyboards, pointing devices, etc.

Embodiments can work with software, hardware, and operating system implementations other than those described herein. Any software, hardware, and operating system implementations suitable for performing the functions described herein can be used.

The Summary and Abstract sections may set forth one or more but not all exemplary embodiments of the present invention as contemplated by the inventors, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for communicating resource loading state and progress in a browser, comprising:

determining, with at least one processor, a state of a resource loading from a remote resource provider to a browser, the state indicating stage of interaction between the browser and the remote resource provider, wherein a plurality of values represents the state, the plurlaity of values comprising a connect state of the browser connecting to the remote resource provider, a wait state of the browser waiting for a response from the remote resource provider and a transfer state of the browser transferring the resource from the remote resource provider;

evaluating, with at least one processor, the progress within the state of the resource loading; and generating, with at least one processor, throbber data representative of the evaluated resource loading progress and the determined state of the resource loading, wherein the throbber data is for rendering a throbber that provides a visual indication on a display device of the evaluated resource loading progress and the determined state of the resource loading.

2. The method of claim 1, wherein evaluating the progress of the resource loading comprises estimating a waiting time for the response from the resource provider.

3. The method of claim 1, wherein evaluating the progress of the resource loading comprises estimating a transferring time for loading the resource from the resource provider.

4. The method of claim 1, wherein generating throbber data comprises automatically selecting one or more properties of the throbber.

5. The method of claim 4, wherein automatically selecting properties of the throbber comprises automatically selecting a type of graphical element for the throbber.

6. The method of claim 4, wherein automatically selecting properties of the throbber comprises automatically selecting a display mode of the throbber.

7. The method of claim 6, wherein automatically selecting the display mode for the throbber comprises automatically selecting a display mode that rotates the throbber.

8. The method of claim 4, wherein automatically selecting properties of the throbber comprises selecting a color property of the throbber.

9. The method of claim 8, wherein automatically selecting a color property for the throbber comprises:

setting the color for the throbber based on the determined state of the resource loading, and setting the saturation level of the color for the throbber based on the evaluated progress of the resource loading.

10. The method of claim 4, wherein automatically selecting a property of the throbber for the throbber comprises resizing the throbber.

11. The method of claim 4, wherein automatically selecting a property of the throbber for the throbber comprises resizing the throbber based on the determined state of the resource loading.

12. The method of claim 1, wherein generating throbber data representative of the evaluated resource loading progress and the determined state of the resource loading comprises:

setting a rotating direction for the throbber based on the determined state of the resource loading, and setting a rotation angle for the throbber based on the evaluated progress of the resource loading.

13. The method of claim 1, wherein the throbber data is rendered to display the throbber for the throbber within a tab in a browser window of a browser on the display device.

14. The method of claim 1, wherein generating throbber data comprises generating throbber data for rendering a throbber that provides a visual indication in the browser.

15. A device comprising:

a state determiner, implemented on a computing device, configured to determine a state of a resource loading from a remote resource provider to a browser, the state indicating a stage of interaction between the browser and the remote resource provider, wherein a plurality of values represents the state, the plurality of values comprising a connect state of the browser connecting to the remote resource provider, a wait state of the browser waiting for a response from the remote resource provider, and a transfer state of the browser transferring the resource from the remote resource provider;

a progress evaluator configured to evaluate the progress within the state of the resource loading; and a throbber generator configured to generate throbber data representative of the evaluated resource loading progress and the determined state of the resource loading, wherein the throbber generator is configured to generate throbber data to be displayed as a throbber that provides a visual indication on a display device of the evaluated resource loading progress and the determined state of the resource loading.

16. The device of claim 15, wherein the throbber has one or more properties.

17. The device of claim 15, wherein the throbber generator is configured to generate throbber data for rendering a throbber that provides a visual indication in the browser.

18. A system comprising:

a throbber generator in a browser;

a renderer; and a display device, wherein the throbber generator includes:

a state analyzer that is configured to determine a state of a resource loading from a remote resource provider to a browser, the state indicating a stage of interaction between the browser and the remote resource provider, wherein a plurality of values represents the state, the plurality of values comprising a connect state of the browser waiting for a response from the remote resource provider, and a transfer state of the browser transferring the resource from the remote resource provider, a progress evaluator that is configured to evaluate progress within the state of the resource loading, and wherein the throbber generator is configured to:

generate throbber data representative of the evaluated resource loading progress and the determined state of the resource loading, and output the generated throbber data to the renderer, wherein the renderer is configured to render the generated throbber data to enable display of a throbber that provides a visual indication on a display device of the evaluated resource loading progress and the determined state of the resource loading.

19. The system of claim 18, wherein the throbber generator is configured to automatically select one or more properties of the throbber including at least one of a type of graphical element and a display mode.

20. The system of claim 18, wherein the throbber generator is configured to generate throbber data for rendering a throbber that provides a visual indication in the browser.

* * * * *

UNITED STATES PATENT AND TRADEMARK OFFICE
CERTIFICATE OF CORRECTION

| | |
|---|---|
| PATENT NO. | : 8,726,182 B1 |
| APPLICATION NO. | : 12/552100 |
| DATED | : May 13, 2014 |
| INVENTOR(S) | : Murphy et al. |

Page 1 of 1

It is certified that error appears in the above-identified patent and that said Letters Patent is hereby corrected as shown below:

In the Claims

Column 8, line 65, claim 1, please replace "plurlaity" with --plurality--

Column 10, line 38, claim 18, please insert --connecting to the remote resource provider, a wait state of the browser-- between --browser-- and --waiting--

Signed and Sealed this
Twenty-first Day of April, 2015

Michelle K. Lee
*Director of the United States Patent and Trademark Office*